(12) United States Patent
Kovach et al.

(10) Patent No.: US 10,030,837 B2
(45) Date of Patent: Jul. 24, 2018

(54) LIGHTING SYSTEM (71) Applicant: Honda Motor Co., Ltd., Tokyo (JP)

(72) Inventors: Steven M. Kovach, Dublin, OH (US); Randall Smock, Redondo Beach, CA (US); Arthur D. Osborne, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 15/009,759

(22) Filed: Jan. 28, 2016

(65) Prior Publication Data
US 2017/0219180 A1    Aug. 3, 2017

(51) Int. Cl.
```
F21S 8/10       (2006.01)
B60Q 1/00       (2006.01)
B60Q 1/26       (2006.01)
F21S 43/14      (2018.01)
F21S 43/237     (2018.01)
```
(Continued)

(52) U.S. Cl.
CPC .......... F21S 48/225 (2013.01); B60Q 1/0041 (2013.01); B60Q 1/2607 (2013.01); F21S 43/14 (2018.01); F21S 43/237 (2018.01); F21S 43/241 (2018.01); F21S 43/249 (2018.01); F21S 43/40 (2018.01)

(58) Field of Classification Search
CPC .... F21S 48/225; F21S 48/215; F21S 48/2237; F21S 43/237; F21S 43/249; F21S 43/40; F21S 43/14; F21S 43/241; B60Q 1/0041; B60Q 1/2607

See application file for complete search history.

(56) References Cited

U.S. PATENT DOCUMENTS 7,695,179 B2 *  4/2010  Eichelberger ......... F21S 48/215
                                                        362/23.13
8,939,623 B2 *  1/2015  Tsukamoto ............. F21V 13/04
                                                        362/511
(Continued)

FOREIGN PATENT DOCUMENTS

JP            2013206875 A  * 10/2013  ............ F21S 48/215

OTHER PUBLICATIONS

Machine Translation of JP 2013-206875A, Watanabe et al., Oct. 2013.*

(Continued)

*Primary Examiner* — Mary Ellen Bowman
(74) *Attorney, Agent, or Firm* — Rankin, Hill & Clark LLP (57) ABSTRACT

A lighting system for providing a lighting image a first substantially linear lighting structure of at least one lighting component of a plurality of lighting components and a second substantially linear lighting structure of the at least one lighting component of the plurality of lighting components. The first substantially linear lighting structure is configured to appear to intertwine with the second substantially linear lighting structure on at least one cross-over point of a plurality of cross-over points. At least one of the first substantially linear lighting structure appears to overlap the second substantially linear lighting structure at the at least one cross-over point of the plurality of cross-over points and/or the second substantially linear lighting structure appears to overlap the first substantially linear lighting structure at the at least one cross-over point of the plurality of cross-over points.

20 Claims, 4 Drawing Sheets

(51) Int. Cl.
    *F21S 43/241*    (2018.01)
    *F21S 43/249*    (2018.01)
    *F21S 43/40*     (2018.01)

(56) References Cited

U.S. PATENT DOCUMENTS

| | | | | |
|---|---|---|---|---|
| 9,784,901 B2* | 10/2017 | Narita | ............ | G02B 6/0045 |
| 2006/0044818 A1 | 3/2006 | Amagasa | | |
| 2010/0008088 A1* | 1/2010 | Koizumi | ............ | B60Q 1/0058 |
| | | | | 362/235 |
| 2014/0301099 A1 | 10/2014 | Watanabe et al. | | |
| 2015/0023046 A1 | 1/2015 | Shido et al. | | |
| 2016/0102834 A1* | 4/2016 | Yamada | ............ | G02B 6/0061 |
| | | | | 362/511 |
| 2016/0121782 A1* | 5/2016 | Soenen | ............ | B60Q 1/0011 |
| | | | | 362/511 |
| 2017/0030546 A1* | 2/2017 | Koshiro | ............ | F21S 48/215 |

OTHER PUBLICATIONS

Lexus LF-NX Concept Crossover (2013) http://images.thecarconnection.com/lrg/lexus-lf-nx-concept-2013-frankfurt-auto-show_100438751_I.jpg Apr. 24, 2015.

\* cited by examiner

LIGHTING SYSTEM

BACKGROUND

When a plurality of lights are provided, crowding of lights and/or positioning of certain lights may minimize the potential benefits provided by specific lights. In some cases, the crowding of lights can cause light from one or more light sources to be polluted by light from other light sources.

BRIEF DESCRIPTION

According to one aspect, a lighting system for providing a lighting image a first substantially linear lighting structure of at least one lighting component of a plurality of lighting components and a second substantially linear lighting structure of the at least one lighting component of the plurality of lighting components. The first substantially linear lighting structure is configured to appear to intertwine with the second substantially linear lighting structure on at least one cross-over point of a plurality of cross-over points. At least one of the first substantially linear lighting structure appears to overlap the second substantially linear lighting structure at the at least one cross-over point of the plurality of cross-over points and/or the second substantially linear lighting structure appears to overlap the first substantially linear lighting structure at the at least one cross-over point of the plurality of cross-over points.

According to a further aspect, a lighting method for providing a lighting image includes providing a first substantially linear lighting structure and providing a second substantially linear lighting structure. The method also includes providing an intertwining appearance between the first substantially linear lighting structure and the second substantially linear lighting structure on at least one cross-over point of a plurality of cross-over points. At least one of the first linear vehicle lighting structure appears to overlap the second linear vehicle lighting structure at the at least one cross-over point of the plurality of cross-over points and/or the second linear vehicle lighting structure appears to overlap the first linear vehicle lighting structure at the at least one cross-over point of the plurality of cross-over points.

According to still another aspect, lighting system for a vehicle comprising a daytime lighting structure implemented within a daytime light guide that includes at least one daytime running light of the vehicle. The lighting system further comprises a turn signal lighting structure implemented within a turn signal light guide that includes at least one turn signal light of the vehicle. The daytime lighting structure is configured to intertwine with the turn signal lighting structure on at least one recessed portion of a plurality of recessed portions provided at the daytime light guide and the turn signal light guide, wherein at least one of: the daytime lighting structure appears to overlap the turn signal lighting structure, and the turn signal lighting structure appears to overlap the daytime lighting structure.

DETAILED DESCRIPTION

Figure 1:
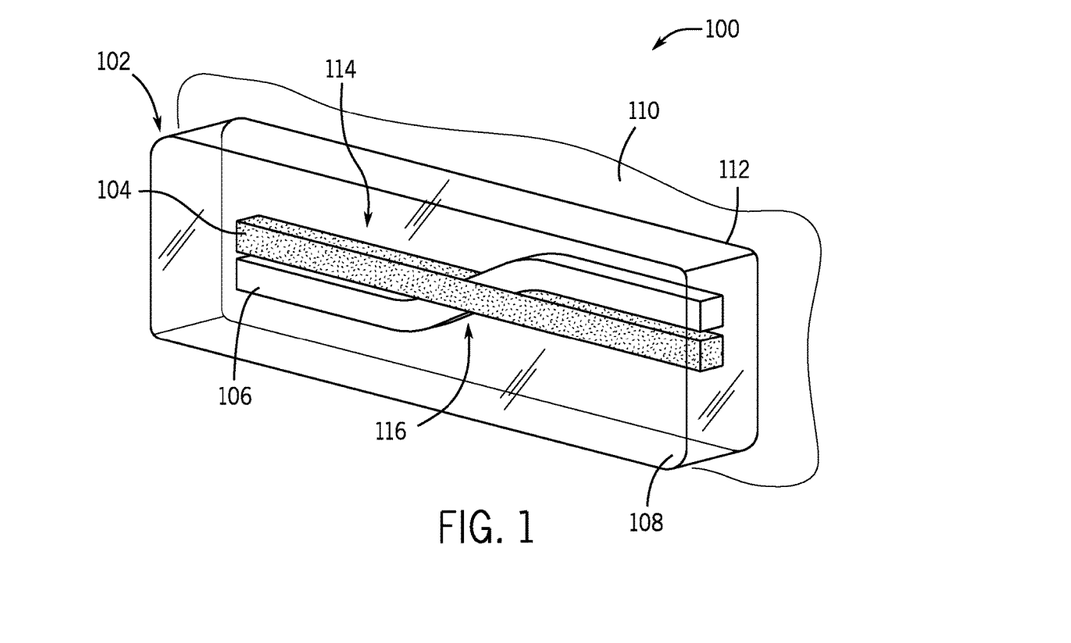
FIG. 1 is a schematic perspective view of a lighting component of the lighting system according to an exemplary embodiment.

Referring now to the drawings, wherein the showings are for purposes of illustrating one or more exemplary embodiments and not for purposes of limiting the same, FIG. 1 is a schematic perspective view of a lighting component 102 of a lighting system 100 according to an exemplary embodiment. It is to be appreciated that the lighting system 100 can include a plurality of lighting components that include similar configurations to the lighting component 102, however, for exemplary purposes FIG. 1 includes the lighting component 102 of the plurality of lighting components. The lighting component 102 can include two or more substantially linear lighting structures (linear lighting structures) 104, 106 that include a first substantially linear lighting structure (first linear lighting structure) 104 and a second substantially linear lighting structure (second linear lighting structure) 106. A front portion 108 of the lighting component 102 can be disposed to face an outward direction opposite to a surface 110 (e.g., light housing/casing surface, vehicle body surface) to be viewed when facing the lighting component 102. A rear portion 112 of the lighting component 102 can be disposed to face an inward direction towards the surface 110. In one embodiment (i.e., the illustrated embodiment), the linear lighting structures 104, 106 can be presented in a widthwise direction within the lighting component 102. In an alternate embodiment (not shown), the linear lighting structures 104, 106 can be presented in the lengthwise direction.

As shown, the lighting component 102 can create a lighting image 114 based on the emission of light from one or more respective light sources included within the two linear lighting structures 104 or 106 that are crossed-over based on the intertwining of one of the linear lighting structures 104 or 106 with the other of the linear lighting structures 104 or 106 at one or more cross-over points 116 of a plurality of cross-over points. For example, as shown in FIG. 1, the first linear lighting structure 104 is presented to appear to intertwine with the second linear lighting structure 106 at the cross-over point 116 that can be one of a plurality of cross-over-points. At each of the plurality of cross-over points of the linear lighting structures 104, 106 can provide an appearance of intertwining and/or overlapping Therefore, at the cross-over point 116, the linear lighting structures 104, 106 provide an appearance of intertwining and/or overlapping that is utilized to present the lighting image 114.

Figure 2:
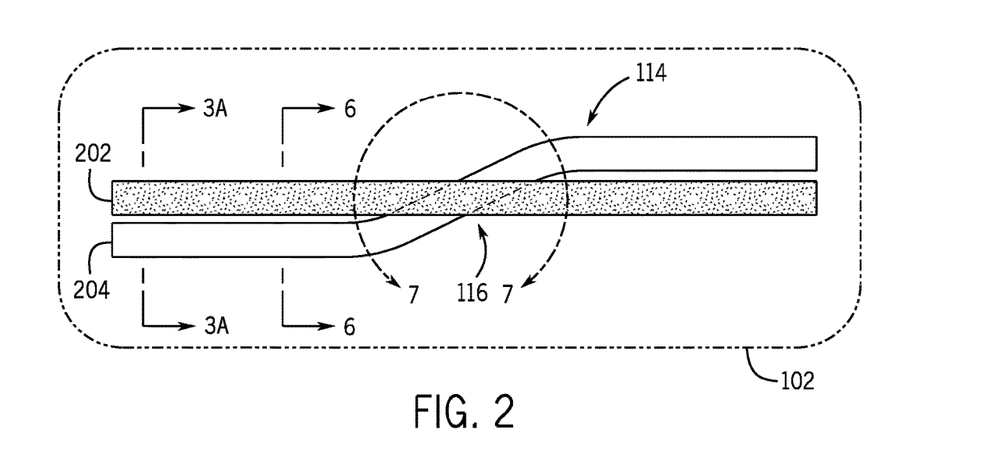
FIG. 2 is a schematic front view of a first exemplary embodiment of the lighting component of the lighting system.

Several non-limiting exemplary embodiments of the lighting system 100 that can be utilized, preferably in a vehicle lighting system (not shown), will now be discussed. FIG. 2 is a schematic front view of a first exemplary embodiment of the lighting component 102 of the lighting system 100. For purposes of simplicity, the embodiment illustrated in FIG. 2 applies to front lighting systems and configurations, however, it is to be appreciated that the embodiment can apply to rear lighting systems and configurations and/or additional lighting systems and configurations located at areas where multiple light sources are grouped. In the exemplary embodiment shown in FIG. 2, the lighting structures of the lighting component 102 can include a daytime lighting structure 202 that includes a linear daytime running light and a turn signal lighting structure 204 that includes a linear turn signal light. In some embodiments additional linear lighting structures (not shown) can be included as part of the lighting component 102 that are provided in lieu of the daytime lighting structure 202 and/or the turn signal lighting structure 204. For example, the lighting component 102 can include a position light linear vehicle lighting structure, a headlight linear vehicle lighting structure, a brake light linear vehicle lighting structure, a fog light linear vehicle lighting structure, etc. Additionally, the lighting component 102 can include additional linear lighting structures (not shown) that are provided in addition to the daytime lighting structure 202 and the turn signal lighting structure 204 to provide multiple types of lighting images. For example, the lighting component 102 can include any combination of the turn signal lighting structure 204, the daytime lighting structure 202, a headlight structure, and a position lighting structure (as additional lighting structures, not shown) that can intertwine at one or more cross-over points 212.

Figure 3A:
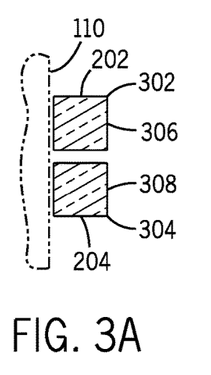
FIG. 3A is a schematic side profile of a light guide of a daytime lighting structure and a light guide of a turn signal lighting structure of FIG. 2.
Figure 3B:
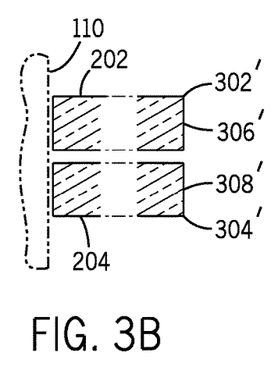
FIG. 3B is a schematic side profile of an alternate embodiment of rectangular shaped light guides that extend or protrude relative to surface to a greater extent than the light guides within the embodiment shown in FIG. 3A.
Figure 3C:
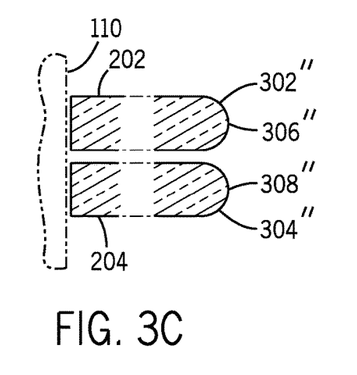
FIG. 3C is a schematic side profile of an alternate embodiment of semi-circular shaped light guides that extend or protrude relative to surface to a greater extent than the light guides within the embodiment shown in FIG. 3A and have rounded profiles at their distal ends, rather than rectangular profiles of the light guides within the embodiments shown FIGS. 3A and 3B.

In one or more embodiments (as illustrated in FIGS. 3A-3C), the daytime lighting structure 202 is positioned to appear overlap the turn signal lighting structure 204 at the cross-over point 116 to provide the lighting image 114 of the daytime running light crossing over the turn signal light. In alternate embodiments (not shown), the turn signal lighting structure 204 can be positioned to appear to overlap the daytime lighting structure 202 to provide the lighting image of the turn signal light crossing over the daytime running light. In some embodiments, the turn signal lighting structure 204 and daytime lighting structure 202 can cross-over one another at numerous cross-over points that are located at more than one portion of the daytime lighting structure 202 and the turn signal lighting structure 204. The numerous cross-over points can include the daytime lighting structure 202 appearing to overlap the turn signal lighting structure 204, the turn signal lighting structure 204 appearing to overlap the daytime lighting structure 202, or the appearance of overlapping of both structures 202, 204 at different cross-over points (similar to cross-over point 116) to provide an interweaving appearance that is presented at numerous portions of the structures 202, 204. In some alternate embodiments, the daytime lighting structure 202 does not appear to overlap the turn signal lighting structure 204 but instead appears to intersect the turn signal lighting structure 204 at the cross-over point 116 to provide an intersecting appearance.

In some embodiments (not shown), one or both of the daytime lighting structure 202 and/or the turn signal lighting structure 204 can be positioned to appear to overlap one another and/or one or more non-linear lighting structures (not shown). For example, the daytime lighting structure 202 can be configured to appear to overlap a non-linear brake light unit. In some cases, one or both of the linear lighting structures 104, 106 can be situated around a non-linear vehicle lighting structure. For example, the daytime lighting structure 202 and the turn signal lighting structure 204 can be situated around one or more non-linear lighting structures including a non-linear headlight unit. It is to be appreciated that additional embodiments of lighting image designs utilizing one or more types of linear and non-linear lighting structures are apparent.

FIG. 3A is a schematic side profile of a light guide of a daytime lighting structure and a light guide of a turn signal lighting structure of FIG. 2. As shown, in one embodiment, the daytime lighting structure 202 can be formed within a first light guide (daytime light guide) 302 having a first end portion 306. The turn signal lighting structure 204 can be formed within a second light guide (turn signal light guide) 304 having a first end portion 308. In an exemplary embodiment, the daytime light guide 302 and the turn signal light guide 304 can each respectively be configured as a single assembly (e.g., housing). In an additional embodiment, the daytime light guide 302 and the turn signal light guide 304 can each or both be configured as two or more separate assemblies that can each include one or more respective light sources that are emitted at one or more directions. The two or more separate assemblies can be joined or partially joined together to form the daytime light guide 302 and/or the turn signal light guide 304.

FIG. 3B is a schematic side profile of an alternate embodiment of rectangular shaped light guides 302', 304' that extend or protrude relative to the surface 110 to a greater extent than the light guides within the embodiment shown in FIG. 3A. The daytime light guide 302' and turn signal light guide 304' can be configured in various dimensions that can extend or protrude relative to the surface 110 and therefore can present a different appearance to the lighting image as compared to the embodiment shown in FIG. 3A. In an exemplary embodiment, the daytime light guide 302' and the turn signal light guide 304' can each respectively be configured as a single assembly. In an additional embodiment, the daytime light guide 302' and the turn signal light guide 304' can each or both be configured as two or more separate assemblies that can each include one or more respective light sources that are emitted at one or more directions. The two or more separate assemblies can be joined together to form the daytime light guide 302' and/or the turn signal light guide 304'.

FIG. 3C is a schematic side profile of an alternate embodiment of semi-circular shaped light guides 302", 304" that extend or protrude relative to the surface 110 to a greater extent than the light guides within the embodiment shown in FIG. 3A and have rounded profiles at their distal ends, rather than rectangular profiles of the light guides within the embodiments shown FIGS. 3A and 3B. The daytime light guide 302" and turn signal light guide 304" can include a semi-circular structure that includes outer faces (disposed opposite the surface 110) that are rounded rather than rectangular such as shown in FIGS. 3A and 3B. The inner faces (disposed against the surface 110) are rectangular similar to the inner faces as shown in FIGS. 3A and 3B. The daytime light guide 302" and turn signal light guide 304" can also be configured in various dimensions that can extend or protrude relative to the surface 110.

In an exemplary embodiment, the daytime light guide 302" and the turn signal light guide 304" can each respectively be configured as a single assembly (e.g., housing). In an additional embodiment, the daytime light guide 302" and the turn signal light guide 304" can each or both be configured as two or more separate assemblies that can each include one or more respective light sources that are emitted at one or more directions. The two or more separate assemblies can be joined together to form the daytime light guide 302" and/or the turn signal light guide 304". In yet an additional (additional to the embodiments shown in FIGS. 3A-3C) embodiment (not shown), the daytime light guide and turn signal light guide can include a fully rounded structure that can be disposed against a mounting component (not shown) that is provided on the surface. It is to be appreciated that the other configurations regarding the shape and structure of the light guides are apparent.

With reference again to FIG. 3A, the first end portion 306 of the daytime light guide 302 and the turn signal light guide 304 can be disposed so that the first end portions 406, 408 are parallel with respect to one another. Due to the crossover of the daytime lighting structure 202 and the turn signal lighting structure 204, (as represented in FIG. 3A), a second end portion (not shown) of the daytime light guide 302 can be directly disposed below a second end portion (not shown) of the turn signal lighting structure 204, so that the second end portions are also parallel with respect to one another. In alternate embodiments, one or more end portions of the daytime light guide 302 and/or the turn signal light guide 304 may not be disposed directly above or below a first and/or second end portion. Therefore, one or both of the first end portions 306, 308 and/or second end portions of the daytime light guide 302 and/or the turn signal light guide 304 can be disposed in non-parallel manner with respect to one another.

In an exemplary embodiment, the daytime lighting structure 202 and the turn signal lighting structure 204 can include various daytime lighting and turn signal lighting types that can include, but are not limited to, distributive lighting with high-intensity central light sources, light-emitting diode (LED) direct lighting, organic light-emitting diode (OLED) direct lighting, incandescent lamp lighting (e.g., tungsten-halogen lamps), high intensity discharge lamps, LED light tubes, neon lamp tubes, optical fiber lighting. In an exemplary embodiment, LED lighting with inner optics are utilized as a form of a high-intensity central light source to achieve distributive lighting of the daytime lighting structure 202 and the turn signal lighting structure 204.

With respect to the daytime lighting structure 202, in one embodiment, one or more daytime running light sources (e.g., LED lights) can be utilized to provide a high-intensity central light source that emits light in one or more directions in form of a white, yellow, or different bright color as required so that the daytime running light is emitted in a bright color that is visible during daylight. The one or more daytime running light sources can be operably connected to a daytime light controller (not shown) of a lighting system (not shown). The daytime light controller can include a control board (not shown) on which a control circuit (not shown) controls an emission of light. In some embodiments, the one or more light sources and related components can be operably connected to a heat sink (not shown) that can be utilized to dissipate heat away from the one or more light sources. In an exemplary embodiment, when the daytime lighting structure 202 includes more than one light source, each of the light sources can be mounted on a singular even plane. In alternate embodiments, when the daytime lighting structure 202 includes more than one light source, each of the light sources can be mounted on different mounting surfaces, which may not be mounted on an even plane, to emit light at different angles within the daytime light guide 302.

In some embodiments, the daytime light controller can be operably connected to one or more ambient light sensors to provide an adaptive lighting feature. The adaptive lighting feature can increase or decrease the intensity of light emitted from the one or more light sources based on the utilization of other vehicle lights (e.g., turn signal lights). More particularly, the one or more ambient light sensors can be specifically utilized to determine if a certain amount of light is being emitted from the turn signal lighting structure 204, and/or one or more non-linear lighting structures to increase or decrease the intensity of bright light (e.g., white light) emitted from one or more daytime running light sources of the daytime lighting structure 202. The adaptive lighting feature can be utilized to ensure that the intensity of the light emitted by the one or more daytime running light sources of the daytime lighting structure 202 is increased when the turn signal is utilized and the turn signal lighting structure 204 is emitting light to limit the disturbance of bright light being emitted from the daytime lighting structure 202.

In additional embodiments, the daytime light controller can be operably connected to one or more daylight sensors to provide the adaptive lighting feature. The daytime light controller can utilize data provided by the daylight sensors to increase or decrease the intensity of light emitted by the one or more light sources based on an amount (e.g., threshold level(s)) of daylight that is present within the surrounding environment. For example, the one or more daylight sensors can be specifically utilized to determine the amount of daylight that is present within the surrounding environment to increase or decrease bright light emitted from one or more LEDs of the daytime lighting structure 202. The adaptive lighting feature can be utilized to ensure that during daylight hours the intensity of light emitted from the daytime lighting structure 202 is high enough for the daytime running lights to be effective (i.e., to be seen by drivers of other vehicles). Alternatively, the adaptive lighting feature can be utilized to ensure that during non-daylight hours, the intensity of light emitted from the daytime lighting structure 202 is lowered so that the daytime lighting does not cause a hazard to drivers of other vehicles.

With respect to the turn signal lighting structure 204, in one embodiment, one or more turn signal light sources (e.g., LED lights) can be utilized to provide a high-intensity central light source that emits light in one or more directions in a form of an amber, orange, and/or brown color to allow light to be emitted to other vehicles as an amber, orange and/or brown color. The one or more turn signal light sources can be provided that can be operably connected to a turn signal light controller (not shown). The turn signal light controller can include a control board (not shown) on which a control circuit (not shown) controls an emission of light. In some embodiments, the one or more light sources and related components can be operably connected to a heat sink (not shown) that can be utilized to dissipate heat away from the one or more light sources. In an exemplary embodiment, when the turn signal lighting structure includes more than one light source, each of the light sources can be mounted on a singular even plane. In alternate embodiments, when the turn signal lighting structure 204 includes more than one light source, each of the light sources can be mounted on different mounting surfaces, which may not be mounted on an even plane, to emit light at different angles within the turn signal light guide 304.

In some embodiments, the turn signal light controller can be operably connected to one or more ambient light sensors to provide the adaptive lighting feature discussed above. For instance, the one or more ambient light sensors can be specifically utilized to determine if light is being emitted from the daytime lighting structure 202, and/or one or more non-linear lighting structures to increase or decrease the intensity of turn signal lighting emitted from one or more light sources of the turn signal lighting structure 204.

Figure 4:
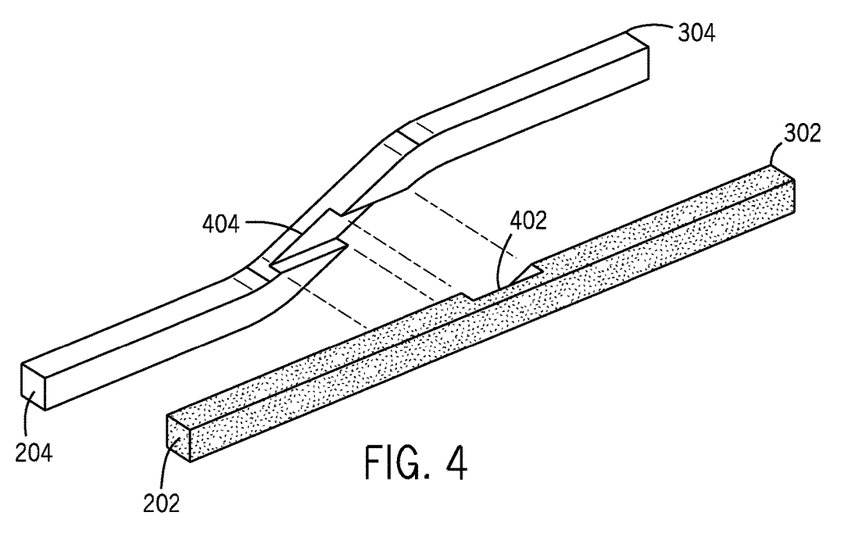
FIG. 4 is an exploded schematic perspective view of the light guide of the daytime lighting structure and the light guide of the turn signal lighting structure of FIG. 2.

FIG. 4 is an exploded schematic perspective view of the light guide 302 of the daytime lighting structure 202 and the light guide 304 of the turn signal lighting structure 204, according to the exemplary embodiment shown in FIG. 3A. In the embodiment shown, the light guide 302 is an overlying light guide that appears to overlap the light guide 304 at the cross-over point (116 of FIG. 2). Additionally, the light guide 304 is an underlying light guide that is appeared to be overlapped by the light guide 302 at the cross-over point. In an alternate embodiment, the turn signal lighting structure 204 can appear to overlap the daytime lighting structure 202 at the cross-over point 116 such that the turn signal light guide 304 is an overlying light guide that appears to overlap the daytime light guide 302 as an underlying light guide at the cross-over point.

As shown, the light guides 302, 304 can both include respective recessed portions 402, 404 that are included at the cross-over point of the light guides 302, 304. It is to be appreciated that each of the light guides 302, 304 can include a plurality of recessed portions that correspond to the plurality of cross-over points. It is also to be appreciated that the plurality of recessed portions of the daytime light guide 302 can include similar configurations to the recessed portion 402 that is included as one of the plurality of recessed portions of the light guide 302. Additionally, it is to be appreciated that the plurality of recessed portions of the turn signal light guide 304 can include similar configurations to the recessed portion 404 that is included as one of the plurality of recessed portions of the light guide 304.

In an exemplary embodiment, the recessed portion 404 can be included on the turn signal light guide 304 in a manner that the daytime light guide 302 can be disposed substantially within the recessed portion 402 in complementary relation so that the daytime lighting structure 202 and the turn signal lighting structure 204 are flush with respect to one another at the cross-over point 312. As represented by the dashed lines in FIG. 4, the recessed portion 402 of the daytime light guide 302 can be positioned substantially within the recessed portion 404 to ensure that the daytime light guide 302 is in close proximity to the turn signal light guide 304. The placement of the daytime light guide 302 within the recessed portion 404 of the turn signal light guide 304 provides a flush intertwining look that is utilized to present the lighting image. In one or more embodiments, the one or more of the recessed portions 402, 404 can include an ultra-thin adhesive that is placed on exterior portions of the recessed portions 402, 404 that allow the turn signal light guide 304 and the daytime light guide 302 to be bound together at the cross-over point.

With respect to the structure of the light guides, in one or more portions, the light guides 302, 304 can consist of one or more assemblies that include fabricated of transparent and/or semi-transparent materials to transmit light generated by one or more light sources in one or more predetermined directions through the expanse of the light guides 302, 304 and toward the outside of the lighting component 102. In one or more embodiments, the light guides can be fabricated of materials including, but not limited to, one or more of polymethylmethacrylate, polycarbonate, polyethylene terephthalate, acrylic, glass, etc. In some embodiments the light guides can be colored to supplement or complement the color provided by one or more light sources, discussed above.

Figure 5:
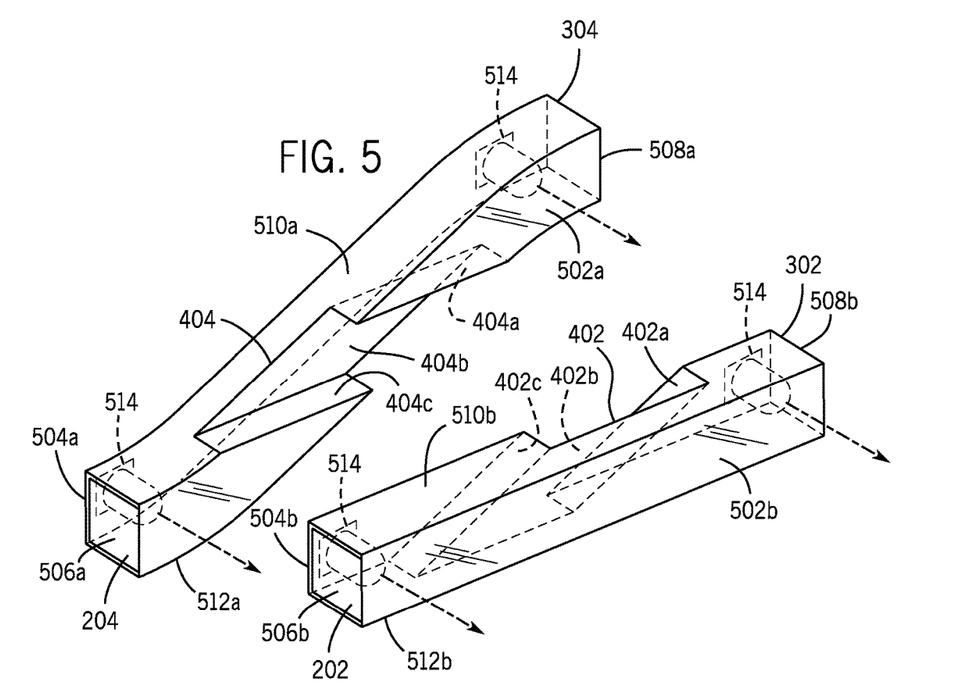
FIG. 5 is a schematic perspective view of the internal structure of a turn signal light guide and a daytime light guide corresponding to the embodiment of FIG. 2.

FIG. 5 is a schematic perspective view of the internal structure of turn signal light guide and the daytime light guide according to an exemplary embodiment. In the embodiment shown in FIG. 5, the light guides 302, 304 include respective hollow channels that include respective outer facing lenses 502a, 502b, respective inner facing lenses 504a, 504b, respective first end facing lens 506a, 506b, and respective second end facing lens 508a, 508b. Additionally, the hollow channels of the light guides 302, 304 include respective top surfaces 510a, 510b and respective bottom surfaces 512a, 512b.

The outer facing lenses 502a, 502b of the light guides 302, 304 can be fabricated of a transparent/semi-transparent material that allows light to be emitted in an outward manner to be viewable from a viewpoint facing the daytime lighting structure 202 and the turn signal lighting structure 204. As shown, the first end facing lenses 506a, 506b are connected to the outer facing lenses 502a, 502b to form an angle that varies based on the shape/structure of the light guides 302, 304 (e.g., of about 90 degrees as represented in FIG. 5). Additionally, the first end facing lenses 506a, 506b are connected to the inner facing lenses 504a, 504b to form an angle that varies based on the shape/structure of the light guide 304. The light guides 302, 304 are further configured such that the second end facing lenses 508a, 508b are connected to the inner facing lenses 504a, 504b to form an angle that varies based on the shape of the light guides 302, 304. Additionally, the second end facing lenses 508a, 508b are also connected to the outer facing lenses 505a, 505b to form an angle that varies based on the shape of the daytime light guide 302. Similarly, the top surfaces 510a, 510b and bottom surfaces 512a, 512b are connected to the outer facing lenses 502a, 502b, inner facing lenses 504a, 504b, first end facing lens 506a, 506b, and second end facing lens 508a, 508b to form an angle that varies based on the shape/structure of the light guides 302, 304.

As shown, in one embodiment, the inner facing lenses 504a, 504b can contain multiple light sources 514 (e.g., daytime running light sources within the daytime light guide 302 and turn signal light sources within the turn signal light guide 304). In alternate embodiments, one or more light sources can be included on the first end facing lenses 506a, 506b, the second end facing lenses 508a, 508b, the top surfaces 510a, 510b and/or the bottom surfaces 512a, 512b.

In an exemplary embodiment, the inner facing lenses 504a, 504b, the first end facing lenses 506a, 506b, the second end facing lenses 508a, 508b, the top surfaces 510a, 510b, and the bottom surfaces 512a, 512b can all include reflective inner surfaces that are configured to reflect incident light emitted by the one or more light sources 514 towards the outer facing lenses 502a, 502b. The reflective inner surfaces (represented in FIGS. 6-8, discussed below) can include a plurality of reflective slits and/or ridges that are elongated and formed to be angled to define an angular distribution of light emitted from the one or more light sources 514 such that reflected light is to be directed towards the outer facing lenses 502a, 502b and through the expanses of the light guides 302, 304.

With respect to the turn signal light guide 304, as shown in FIG. 5, the recessed portion 404 of the turn signal light guide 304 is disposed on the outer facing lens 502a so that the recessed portion 402 of the daytime light guide 302 can be disposed substantially within the recessed portion 404 of the turn signal light guide 304. The recessed portion 404 includes a front facing wall 404b, and interior facing walls 404a, 404c (e.g., lenses) that can be fabricated of a different non-transparent material as the rest of the turn signal light guide 304. The front facing wall 404b and the interior facing walls 404a, 404c of the recessed portion 404 can also include the reflective inner surface to ensure that all light is reflected away from the recessed portion 404 and there no spillage of light that occurs between the turn signal light guide 304 and the daytime light guide 302.

Specifically, the reflective inner surface of the front facing wall 404b can reflect light away from the recessed portion 404 in an angular distribution of light such that light is reflected inward from the front facing wall 404b towards the reflective inner surface of the inner facing lens 504a to be guided towards non-recessed portions of the outer facing lens 502a. Additionally, the reflective inner surface of the interior facing wall 404c can reflect light to the first end facing lens 506a, and the interior facing wall 404a can reflect light to the second end facing lens 508a. In other words, the reflective inner surfaces can reflect light away from the recessed portion 404 such that the light reflected from the one or more light sources is directed away from the recessed portion 404 (i.e., away from the cross-over point between the overlying daytime lighting structure and the underlying turn signal lighting structure) and rather reflected through the non-recessed portions of the outer facing lens 502a and the expanse of the turn signal light guide 304. For example, in the embodiment wherein the turn signal lighting structure 204 is disposed below the daytime lighting structure 202, this design ensures that red/orange/amber colored light emitted from the turn signal lighting structure does not disturb white light emitted from the daytime lighting structure.

With respect to the daytime light guide 302, the recessed portion 402 is disposed on the inner facing lens 504b to be disposed substantially within the recessed portion 404 so that the daytime lighting structure 202 and the turn signal lighting structure 204 are flush with respect to one another at the cross-over point. The recessed portion 402 includes a rear facing wall 402b, and interior facing walls 402a, 402c that can be fabricated of a different non-transparent material as the rest of the daytime light guide 302. The rear facing wall 402b and the interior facing walls 402a, 402c of the recessed portion 402 can also include the reflective inner surface to ensure that all light is reflected away from the recessed portion 402 to ensure there no spillage of light that occurs between the daytime light guide 302 and the turn signal light guide 304.

The reflective inner surface of the rear facing wall 402b and the interior facing walls 402a, 402c can reflect light away from the recessed portion 402 in an angular distribution of light such that light is reflected outward from the rear facing wall 402b towards the outer facing lens 502b. Additionally, the reflective inner surface of the interior facing wall 402a can reflect light to the second end facing lens 508b, and the interior facing walls 402c can reflect light to the first end facing lens 506b. In other words, the reflective inner surfaces can reflect light away from the recessed portion 402 such that the light reflected from the one or more light sources is directed away from the recessed portion 402 (i.e., away from the cross-over point between the overlying daytime lighting structure and the underlying turn signal lighting structure) and rather reflected through the outer facing lens 502b and the expanse of the daytime light guide 302. For example, in the embodiment wherein the turn signal lighting structure 204 is disposed below the daytime lighting structure 202, this design ensures that white colored light emitted from the daytime lighting structure 202 does not disturb red/orange/amber colored light emitted from the turn signal lighting structure 204.

In alternate embodiments, the recessed portions 402, 404 can include a light absorbent surface that includes light absorbing materials that are capable of absorbing light emitted by the one or more light sources 514 to block out light from being spilled at or near the recessed portions 402, 404. In other words, one or more of the front facing wall 404b, rear facing wall 402b, interior facing walls 404a, 404c, 402a, 402c can include a non-reflective light absorbent material that can be utilized to completely block out any light from spilling outside of the recessed portions 402, 404.

Figure 6:
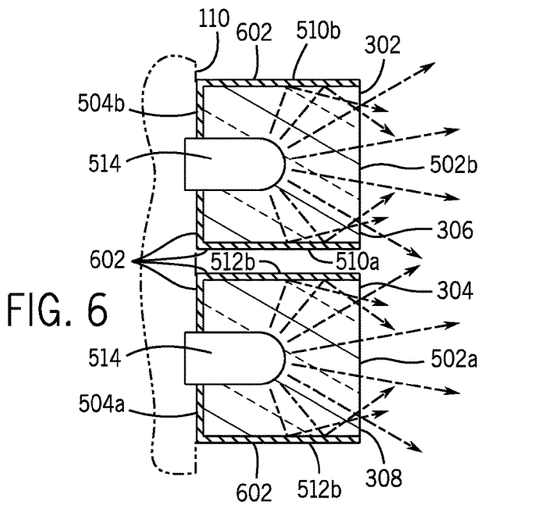
FIG. 6 is a schematic side profile of first end portions of the daytime light guide and the turn signal light guide of FIGS. 2 and 5 showing light being emitted from one or more light sources and being reflected off of respective reflective inner surfaces of a respective inner facing lens and respective top and bottom surfaces to an outward direction through a respective outer facing lens of the daytime light guide and the turn signal light guide.

FIG. 6 is a schematic side profile of first end portions 306, 308 of the daytime light guide 302 and a turn signal light guide 304, according to the exemplary embodiment of FIGS. 2 and 5. The light guides 302, 304 include the outer facing lenses 502a, 502b that are configured with transparent or semi-transparent materials at the respective first end portions 406, 408 of the daytime light guide 302 and the turn signal light guide 304. As shown, the inner facing lens 504a, 504b, top surfaces 510a, 510b, and bottom surfaces 512a, 512b of the light guides 302, 304 include the reflective inner surface 602 that is utilized to reflect and guide light emitted from the one of more light sources 514 outwards through the outer facing lenses 502a, 502b as represented by the arrows. As discussed, the reflective inner surface 602 provided at the first end facing lens 506a, 506b and second end facing lens 508a, 508b (not shown in FIG. 7) reflect and guide light inwards through the expanses of the light guides 302, 304 to ensure that the light guides 302, 304 are sufficiently lit to provide the lighting image. As shown, at the first end portions 306, 308, the reflective inner surface 602 disallows the disturbance of light between the light guides 302, 304 to ensure that light is not intermixed between the daytime lighting structure 202 and the turn signal lighting structure 204.

Figures 7, 8:
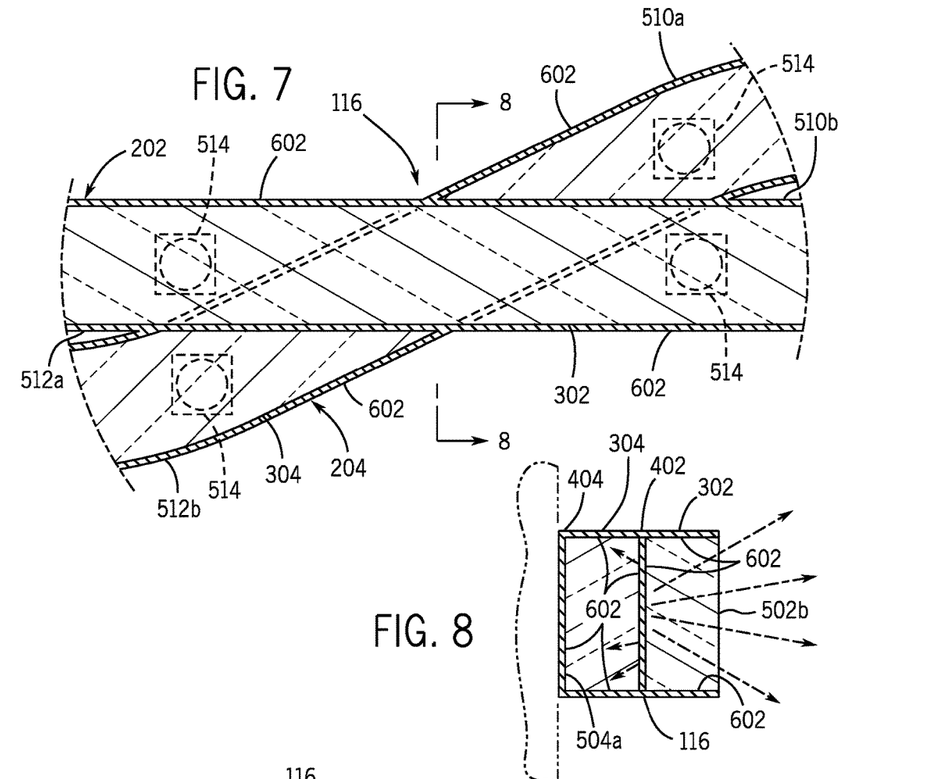
FIG. 7 is a schematic front sectional view of a cross-over point between the daytime lighting structure and the turn signal lighting structure corresponding to the embodiment of FIGS. 2 and 5.
FIG. 8 is a schematic cross-sectional view of the cross-over point between the daytime lighting structure and the turn signal lighting structure of FIGS. 2, 5, and 7.

FIG. 7 is a schematic front sectional view of a cross-over point 116 between the daytime lighting structure 202 and the turn signal lighting structure 204, according to the exemplary embodiment of FIGS. 2 and 5. As discussed above, in an exemplary embodiment, the daytime lighting structure 202 and the turn signal lighting structure 204 are situated so that the structures are flush with one another at the cross-over point 116. In alternate embodiments, the structures 202, 204 can be configured so that they are situated at different levels such that one of the structures 202, 204 protrudes in an outward direction (i.e., away from a vehicle body) with respect to the other of the structures 202, 204 which may protrude inward toward the vehicle body. The light guides 302, 304 can be configured to interlock with one another at the cross-over point 116. As shown, the reflective inner surface 602 is included at respective top surfaces 510a, 510b and respective bottom surfaces 512a, 512b to reflect light within respective elongate channels of the daytime light guide 302 and the turn signal light guide 304. This design ensures that the disturbance of light between the daytime light guide 302 and the turn signal light guide 304 is disallowed at portions of the light guides 302, 304 adjacent to the cross-over point 116, wherein the daytime light guide 302 and the turn signal light guide 304 are in close proximity to one another.

FIG. 8 is a schematic cross-sectional view of the cross-over point 116 between the daytime lighting structure 202 and the turn signal lighting structure 204 of FIGS. 2, 5, and 7. It is to be appreciated that the configurations (e.g., shape, thickness) of the daytime lighting structure 202 and the turn signal lighting structure 204 illustrated in FIG. 8 is exemplary and that additional configurations are apparent. As shown, the reflective inner surface 602 is disposed within the recessed portion 402 of the daytime light guide 302 at the cross-over point 116 so that light is reflected away from the recessed portion 402 of the daytime light guide 302 in an outward direction towards the outer facing lenses 602b. Additionally the reflective inner surface 602 is disposed within the recessed portion 404 of the turn signal light guide 304 at the cross-over point 116 so that light is reflected towards the inner facing lens 504a away from the cross-over point 116, as represented by arrows. As shown, the utilization the reflective inner surfaces 602 ensure that there is no disturbance of light between the structures 202, 204 at the cross-over point 116. Make a note about the thicknesses being only exemplary/illustration purposes only.

Figure 9:
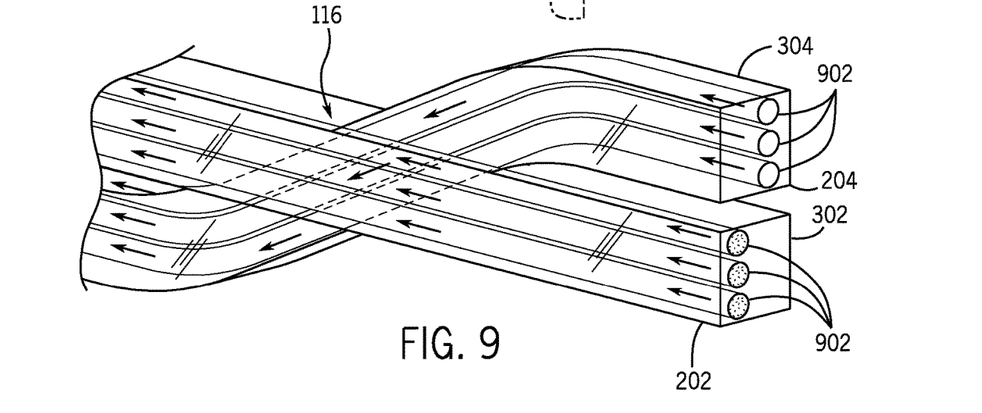
FIG. 9 is a schematic perspective view of an alternate embodiment of the daytime lighting structure and the turn signal lighting structure of the lighting component.

FIG. 9 is a schematic perspective view of an alternate embodiment of the daytime lighting structure 202 and the turn signal lighting structure 204 of the lighting component 102. As shown, in this embodiment, the light guides 302, 304 can include a plurality of light channels 902 that can be configured of transparent/semi-transparent materials and can separately guide light emitted by one or more light sources through each light respective channel. It is to be appreciated that multiple different sources of light can be utilized within one or more of the plurality of light channels 902. Similar to embodiments discussed above, the recessed portions of each of the light guides 302, 304 provided at the cross-over point 116 can include light reflective inner surfaces and/or light absorbent surfaces to disallow the disturbance of light at the cross-over point 116. The plurality of light channels 902 can provide an alternate lighting image that provides separate paths of light that can be provided by one or more light sources emitted within each of the light channels 902. In some embodiments, the plurality of light channels 902 can also be utilized to provide additional types of vehicle lighting within the light guides 302, 304. For example, in addition to the daytime running lighting and turn signal lighting, one or more of the light channels 902 can be utilized to provide (vehicle) position lighting.

In some embodiments, the light guides 302, 304 can include a plurality of LED light tubes (in place of the plurality of light channels 902 as shown in FIG. 9). The LED light tubes can utilize a plurality of LEDs that are directed towards the outer facing lens of the light guides 302, 304 to provide an alternate lighting image. Further in some additional embodiments, the light guides 302, 304 can include can include one or more LED light tubes that are disposed behind and/or partially within (clear lens) portions of the light guides 302, 304. In additional embodiments, the one or more LED light tubes and/or optical fiber lighting can be mechanically coupled to front portions (e.g., on a clear exterior wall portion of the front facing wall) and/or rear portions of the light guides 302, 304 (on an clear interior facing wall portion of a rear facing wall) in one or more rows to provide an alternate lighting image that provides separate paths of light that can be provided by one or more light sources emitted outside of each of the light channels 902.

It will be understood by one of ordinary skill in the art that the systems described herein may be adapted and modified as appropriate for the application being addressed or may be employed in other suitable applications, and that such adaptions and modifications are for purposes of illustrating one or more exemplary embodiments and not for purposes of limiting same. It will also be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lighting system comprising:
   a first substantially linear lighting structure of at least one lighting component of a plurality of lighting components; and
   a second substantially linear lighting structure of the at least one lighting component of the plurality of lighting components;
   wherein the first substantially linear lighting structure is configured to appear to intertwine with the second substantially linear lighting structure on at least one cross-over point of a plurality of cross-over points;
   wherein at least one of the first substantially linear lighting structure appears to overlap the second substantially linear lighting structure at the at least one cross-over point of the plurality of cross-over points and/or the second substantially linear lighting structure appears to overlap the first substantially linear lighting structure at the at least one cross-over point of the plurality of cross-over points, wherein the at least one cross-over point of the plurality of cross-over points is configured to accept at least one of: the first substantially linear lighting structure and the second substantially linear lighting structure.

2. The lighting system of claim 1, wherein the first substantially linear lighting structure includes at least one first light guide and the second substantially linear lighting structure includes at least one second light guide, wherein the at least one first light guide and the at least one second light guide includes at least one of a single assembly, or more than one assembly.

3. The lighting system of claim 2, wherein the first substantially linear lighting structure is disposed within at least one recessed portion of a plurality of recessed portions formed within the body of the second light guide;
   wherein the at least one recessed portion formed within the body of the second light guide is positioned at the at least one cross-over point; and wherein at least one of: the at least one first light guide appears to overlap the at least one second light guide, and the at least one second light guide appears to overlap the at least one first light guide.

4. The lighting system of claim 3, wherein the second substantially linear lighting structure is disposed within at least one recessed portion of a plurality of recessed portions formed within the body of the at least one first light guide;
wherein the at least one recessed portion formed within the body of the at least one first light guide is positioned at the at least one cross-over point; and
wherein at least one of: the at least one first light guide appears to overlap the at least one second light guide, and the at least one second light guide appears to overlap the at least one first light guide.

5. The lighting system of claim 1, further comprising:
at least one first lighting structure implemented within at least one first light guide; and
at least one second lighting structure implemented within at least one second light guide;
wherein the at least one first lighting structure is configured to intertwine with the at least one second lighting structure at the at least one cross-over point of the plurality of cross-over points;
wherein at least one of: the at least one first lighting structure appears to overlap the at least one second lighting structure at the at least one cross-over point of the plurality of cross-over points and/or the at least one second lighting structure appears to overlap the at least one first lighting structure at the at least one cross-over point of the plurality of cross-over points.

6. The lighting system of claim 2, wherein the at least one first light guide comprises:
an outer facing lens, an inner facing lens, a first end facing lens, a second end facing lens, a top surface, and a bottom surface;
wherein the inner facing lens includes the at least one recessed portion and at least one non-recessed portion;
wherein the inner facing lens, the first end facing lens, the second end facing lens, the top surface, and the bottom surface include reflective inner surfaces that are configured to reflect incident light emitted by at least one first light source towards at least one of: the outer facing lens, and an expanse of at least one channel of the first light guide.

7. The lighting system of claim 6, wherein the at least one recessed portion of the inner facing lens of the at least one first light guide comprises a rear facing wall and interior facing walls that include reflective inner surfaces that are configured to reflect incident light emitted by the at least one first light source towards at least one of: the outer facing lens, and the expanse of the at least one channel of the at least one first light guide.

8. The lighting system of claim 2, wherein the at least one second light guide comprises:
an outer facing lens, an inner facing lens, a first end facing lens, a second end facing lens, a top surface, and a bottom surface;
wherein the outer facing lens includes the at least one recessed portion and at least one non-recessed portion;
wherein the first end facing lens, the second end facing lens, the top surface, the bottom surface, and a recessed portion of the outer facing lens include reflective inner surfaces that are configured to reflect incident light emitted by at least one second light source towards at least one of: a non-recessed portion of the outer facing lens, and an expanse of at least one channel of the at least one second light guide.

9. The lighting system of claim 8, wherein the at least one recessed portion of an outer facing lens of the at least one second light guide comprises a front facing wall and interior facing walls that include reflective inner surfaces that are configured to reflect incident light emitted by the at least one second light source towards at least one of: the inner facing lens, and the expanse of the at least one channel of the at least one second light guide.

10. A lighting method comprising:
providing a first substantially linear lighting structure;
providing a second substantially linear lighting structure, and
providing an intertwining appearance between the first substantially linear lighting structure and the second substantially linear lighting structure on at least one cross-over point of a plurality of cross-over points, wherein at least one of the first linear lighting structure appears to overlap the second linear lighting structure at the at least one cross-over point of the plurality of cross-over points and/or the second linear lighting structure appears to overlap the first linear lighting structure at the at least one cross-over point of the plurality of cross-over points, wherein the at least one cross-over point of the plurality of cross-over points is configured to accept at least one of: the first substantially linear lighting structure and the second substantially linear lighting structure.

11. The method of claim 10 further comprising:
providing the first substantially linear lighting structure with at least one first light guide including at least one recessed portion of a plurality of recessed portions formed within a body of the at least one first light guide; and
providing the second substantially linear lighting structure with at least onE second light guide including at least one recessed portion of a plurality of recessed portions formed within a body of the at least one second light guide, wherein the at least one first light guide and the at least one second light guide includes at least one of a single assembly, or more than one assembly.

12. The method of claim 11 further comprising:
providing the intertwining appearance between the first substantially linear lighting structure and the second substantially linear lighting structure includes at least one of:
disposing the first substantially linear lighting structure within the at least one recessed portion formed within the body of the at least one second light guide that is positioned at the at least one cross-over point, wherein at least one of: the at least one first light guide appears to overlap the at least one second light guide, and the at least one second light guide appears to overlap the at least one first light guide.

13. The method of claim 11 further comprising:
providing the intertwining appearance between the first substantially linear lighting structure and the second substantially linear lighting structure includes at least one of:
disposing the second substantially linear lighting structure within the at least one recessed portion of the at least one first light guide, wherein at least one of: the at least one first light guide appears to overlap the at least one second light guide, and the at least one second light guide appears to overlap the at least one first light guide.

14. The lighting method of claim 11, further comprising:
providing the intertwining appearance between the first substantially linear lighting structure and the second substantially linear lighting structure includes providing an outer facing lens, an inner facing lens, a first end facing lens, a second end facing lens, a top surface, and a bottom surface of the at least one first light guide, wherein the inner facing lens includes the at least one recessed portion and at least one non-recessed portion, wherein the inner facing lens, the first end facing lens, the second end facing lens, the top surface, and the bottom surface include reflective inner surfaces that are configured to reflect incident light emitted by at least one first light source towards at least one of: the outer facing lens, and an expanse of at least one channel of the at least one first light guide.

15. The lighting method of claim 11 further comprising:
providing the intertwining appearance between the first substantially linear lighting structure and the second substantially linear lighting structure includes providing an outer facing lens, an inner facing lens, a first end facing lens, a second end facing lens, a top surface, and a bottom surface of the at least one second light guide, wherein the outer facing lens includes the at least one recessed portion and at least one non-recessed portion,
wherein the first end facing lens, the second end facing lens, the top surface, the bottom surface, and a recessed portion of the outer facing lens include reflective inner surfaces that are configured to reflect incident light emitted by at least one second light source towards at least one of: a non-recessed portion of the outer facing lens, and an expanse of at least one channel of the at least one second light guide.

16. A lighting system for a vehicle, comprising:
a daytime lighting structure implemented within a daytime light guide that includes at least one daytime running light of the vehicle; and
a turn signal lighting structure implemented within a turn signal light guide that includes at least one turn signal light of the vehicle,
wherein the daytime lighting structure is configured to intertwine with the turn signal lighting structure on at least one recessed portion of a plurality of recessed portions provided at the daytime light guide and the turn signal light guide, wherein at least one of: the daytime lighting structure appears to overlap the turn signal lighting structure, and the turn signal lighting structure appears to overlap the daytime lighting structure.

17. The lighting system of claim 16, wherein the plurality of recessed portions include at least one of: light reflective inner surfaces, and light absorbent inner surfaces to disallow light to be emitted from the recessed portions.

18. The lighting system of claim 16, wherein the at least one recessed portion of the daytime light guide is configured to accept the at least one recessed portion of the turn signal light guide within the at least one recessed portion of the turn signal light guide, and the at least one recessed portion of the turn signal light guide is configured to accept the at least one recessed portion of the daytime light guide within the at least one recessed portion of the daytime light guide.

19. The lighting system of claim 16, wherein the at least one recessed portion of the daytime light guide includes a rear facing wall and interior facing walls that include reflective inner surfaces that are configured to reflect incident light emitted by a day time running light towards at least one of: an outer facing lens, and an expanse of the at least one channel of the daytime light guide.

20. The lighting system of claim 16, wherein the at least one recessed portion of the turn signal light guide includes a front facing wall and interior facing walls that include reflective inner surfaces that are configured to reflect incident light emitted by at least one vehicle turn signal light source towards at least one of: an inner facing lens, and an expanse of the at least one channel of the turn signal light guide.

\* \* \* \* \*